US011991763B2

(12) United States Patent
Lee et al.

(10) Patent No.: US 11,991,763 B2
(45) Date of Patent: May 21, 2024

(54) SIDELINK CONNECTION REQUEST BASED ON CONGESTION LEVEL

(71) Applicant: LG ELECTRONICS INC., Seoul (KR)

(72) Inventors: Youngdae Lee, Seoul (KR); Taehun Kim, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 417 days.

(21) Appl. No.: 17/295,358

(22) PCT Filed: Jan. 17, 2020

(86) PCT No.: PCT/KR2020/000849
§ 371 (c)(1),
(2) Date: May 19, 2021

(87) PCT Pub. No.: WO2020/153667
PCT Pub. Date: Jul. 30, 2020

(65) Prior Publication Data
US 2022/0015166 A1    Jan. 13, 2022

(30) Foreign Application Priority Data

Jan. 22, 2019 (KR) .......... 10-2019-0007818
Jan. 22, 2019 (KR) .......... 10-2019-0007819
Jan. 22, 2019 (KR) .......... 10-2019-0007911

(51) Int. Cl.
*H04W 76/14* (2018.01)
*H04W 72/0453* (2023.01)
(Continued)

(52) U.S. Cl.
CPC ....... *H04W 76/14* (2018.02); *H04W 72/0453* (2013.01); *H04W 72/52* (2023.01); *H04W 92/18* (2013.01)

(58) Field of Classification Search
CPC . H04W 76/14; H04W 72/0453; H04W 72/52; H04W 92/18
See application file for complete search history.

(56) References Cited

U.S. PATENT DOCUMENTS

| 2010/0265847 A1* | 10/2010 | Lee .......... H04L 5/001 370/254 |
| 2012/0207023 A1* | 8/2012 | Tsuda .......... H04W 48/06 370/235 |
| 2012/0207121 A1* | 8/2012 | Dalsgaard .......... H04W 48/16 370/329 |

FOREIGN PATENT DOCUMENTS

| WO | 2017121618 | 7/2017 |
| WO | 2018174610 | 9/2018 |
| WO | 2018174684 | 9/2018 |

OTHER PUBLICATIONS

3GPP TSG RAN E-UTRA MAC protocol specification (Release 15), 3GPP TS 36.321 V15.4.0, Jan. 13, 2019, sections 5.14.1.1-5.14.1.5, 5.14.2.1, 6.2.4.

(Continued)

*Primary Examiner* — Brenda H Pham
(74) *Attorney, Agent, or Firm* — BRYAN CAVE LEIGHTON PAISNER LLP

(57) ABSTRACT

A method and apparatus for sidelink connection request based on congestion level for establishing a direct connection between wireless devices is provided. A first wireless device triggers a signaling procedure based on a congestion level of at least one carrier, selects a carrier among the at least one carrier, and transmits a message in the signaling procedure on the selected carrier. Upon receiving the mes- (Continued)

sage, a second wireless device may perform carrier reselection.

4 Claims, 20 Drawing Sheets

(51) Int. Cl.
*H04W 72/52* (2023.01)
*H04W 92/18* (2009.01)

(56) References Cited

OTHER PUBLICATIONS

LG Electronics Inc., TX carrier reselection when cbr-pssch-TXConfigList is not configured, R2-1818409, 3GPP TSG-RAN2 Meeting #104, Spokane, USA, Nov. 2, 2018, section 5.14.1.5.

* cited by examiner

FIG. 12

Initiating UE | | Target UE

Start T4100 →DIRECT_COMMUNICATION_REQUEST→

Stop T4100 ←DIRECT_COMMUNICATION_ACCEPT←

Start T4108

----------------------------------OR----------------------------------

Start T4100 →DIRECT_COMMUNICATION_REQUEST→

Stop T4100 ←DIRECT_COMMUNICATION_REJECT←

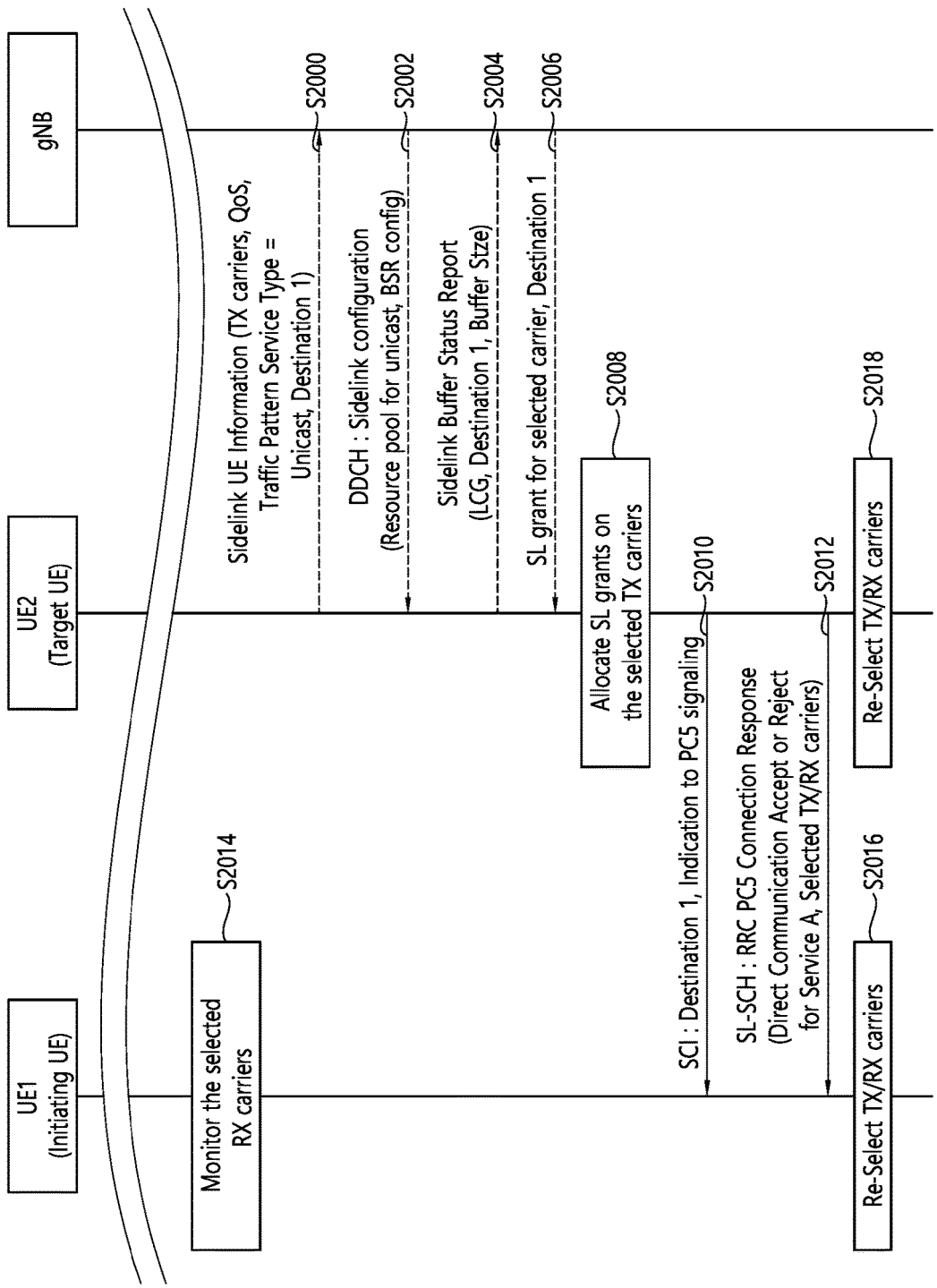

SIDELINK CONNECTION REQUEST BASED ON CONGESTION LEVEL

This application is the National Stage filing under 35 U.S.C. 371 of International Application No. PCT/KR2020/000849 filed on Jan. 17, 2020, which claims priority to Korean Patent Application Nos. 10-2019-0007818 filed on Jan. 22, 2019; 10-2019-0007819 filed on Jan. 22, 2019 and 10-2019-0007911 filed on Jan. 22, 2019, the contents of which are hereby incorporated by reference herein in their entirety.

TECHNICAL FIELD

The present disclosure relates to sidelink connection request based on congestion level for establishing a direct connection between wireless devices.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

Until Rel-15, broadcast transmission is supported only for V2X communication. In case of NR V2X, unicast and groupcast transmission may also be supported for V2X communication as well as broadcast transmission. Unicast transmission is expected to be used for high reliability and low latency cases, e.g., extended sensor sharing and remote driving, emergency, etc. Hence, PC5 signaling used for establishing and/or managing unicast link should also have reliability.

In an aspect, a method for a first wireless device in a wireless communication system is provided. The method includes triggering a signaling procedure based on a congestion level of at least one carrier, selecting a carrier among the at least one carrier, and transmitting a message in the signaling procedure on the selected carrier.

In another aspect, a method for a second wireless device in a wireless communication system is provided. The method includes monitoring at least one carrier, receiving, from a first wireless device, a first message on a first carrier among the at least one carrier, performing carrier reselection from the first carrier to a second carrier among the at least one carrier, and transmitting, to the first wireless device, a second message as a response to the first message.

In another aspect, an apparatus for implementing the above method is provided.

The present disclosure can have various advantageous effects.

For example, one wireless device performing sidelink communication can perform fast and reliable connection establishment with another wireless device by selecting multiple carriers of which congestion level is low enough to provide sidelink grant and reliable signaling to the wireless device with little loss, in particular when what triggers sidelink connection or sidelink service are mapped to multiple carriers.

For example, the system can provide fast and reliable sidelink connection establishment for a wireless device performing sidelink communication with another wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 12 shows an example of PC5 link setup to which implementations of the present disclosure is applied.

FIGS. 19 and 20 shows an example of PC5 connection establishment between two UEs according to implementations of the present disclosure.

DETAILED DESCRIPTION

Figure 1:
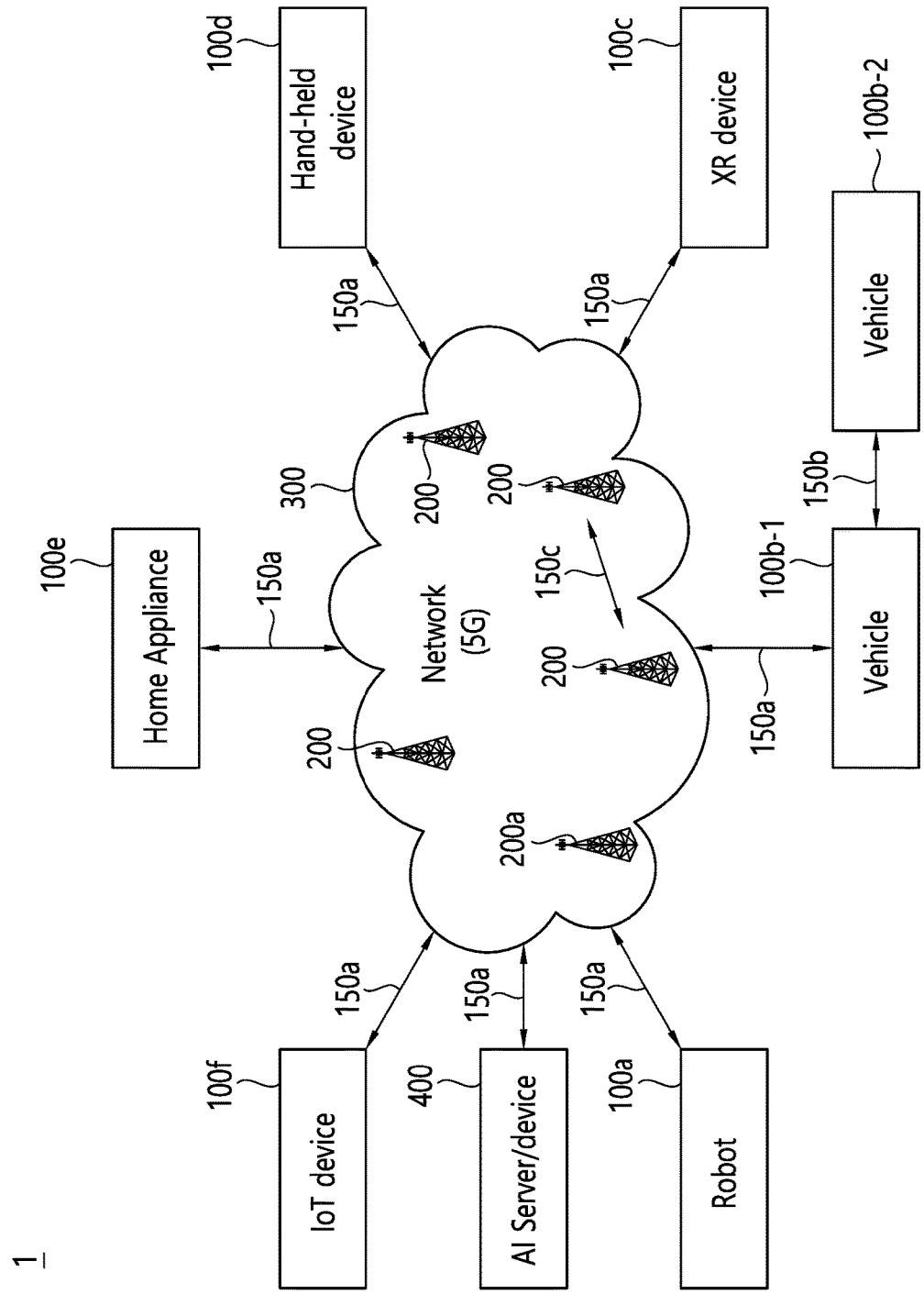
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
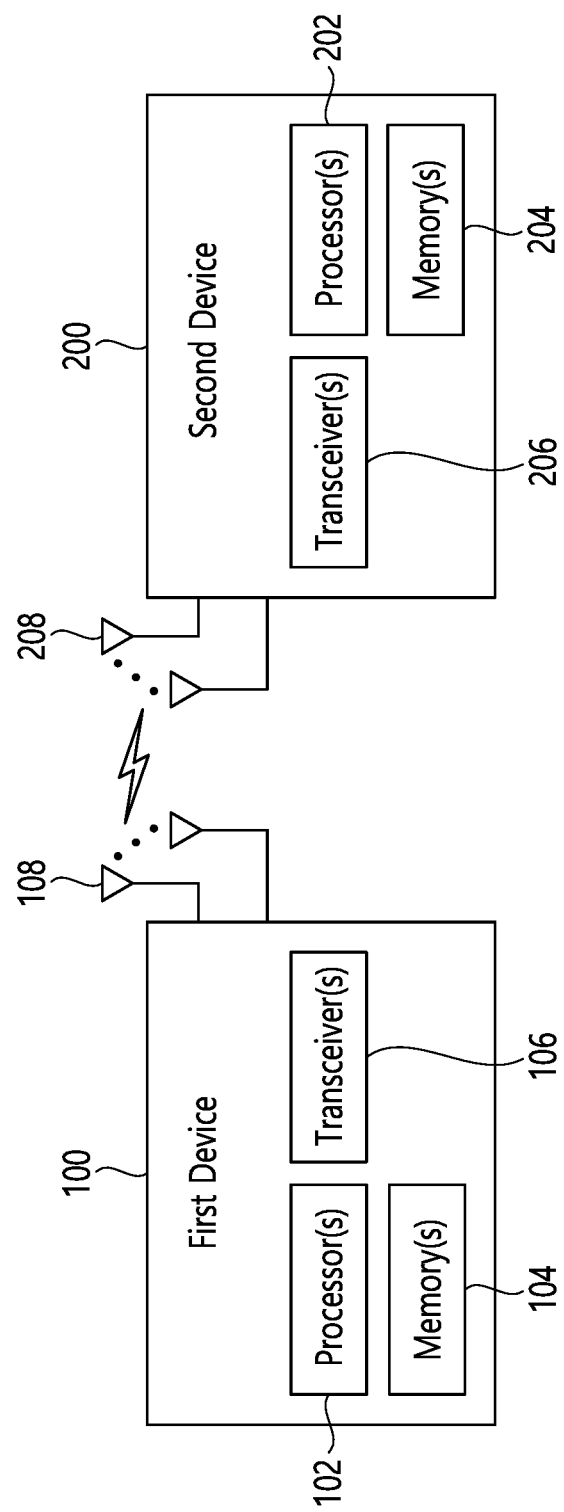
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of command.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
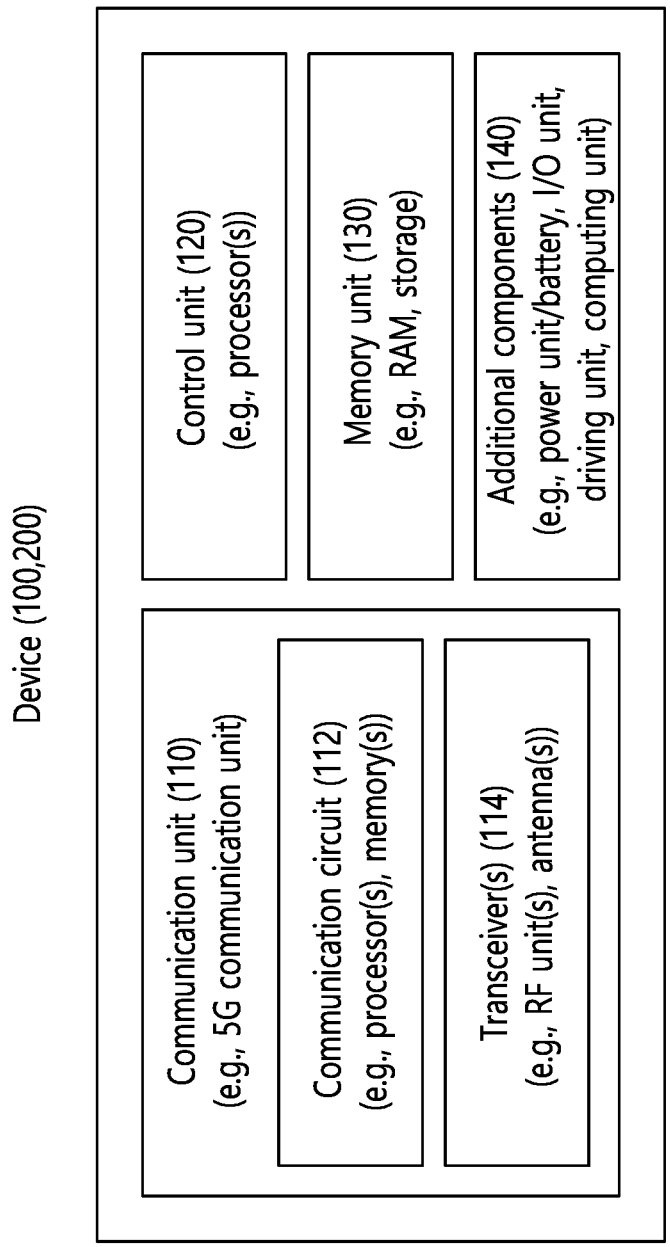
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
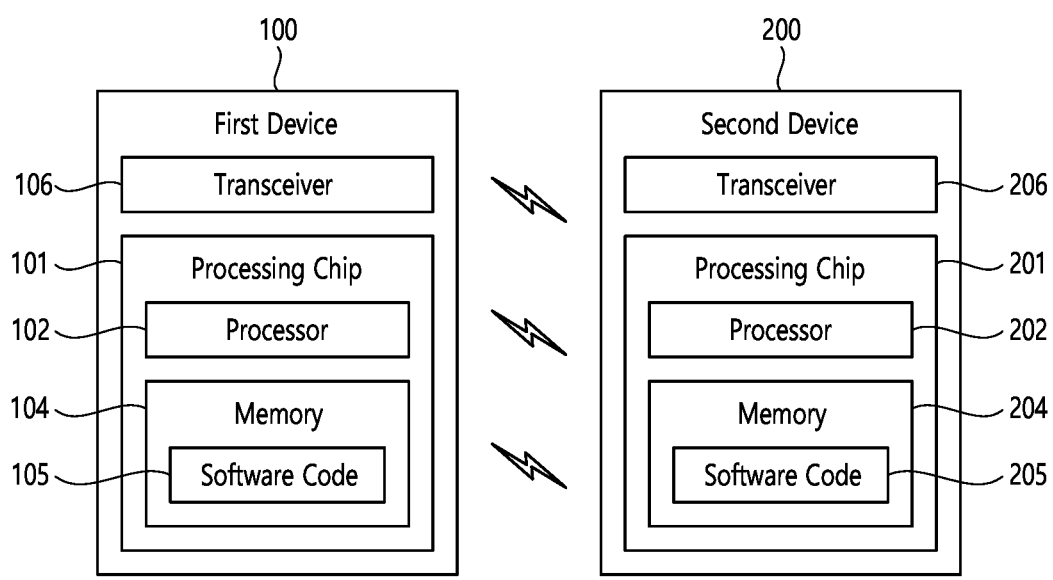
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
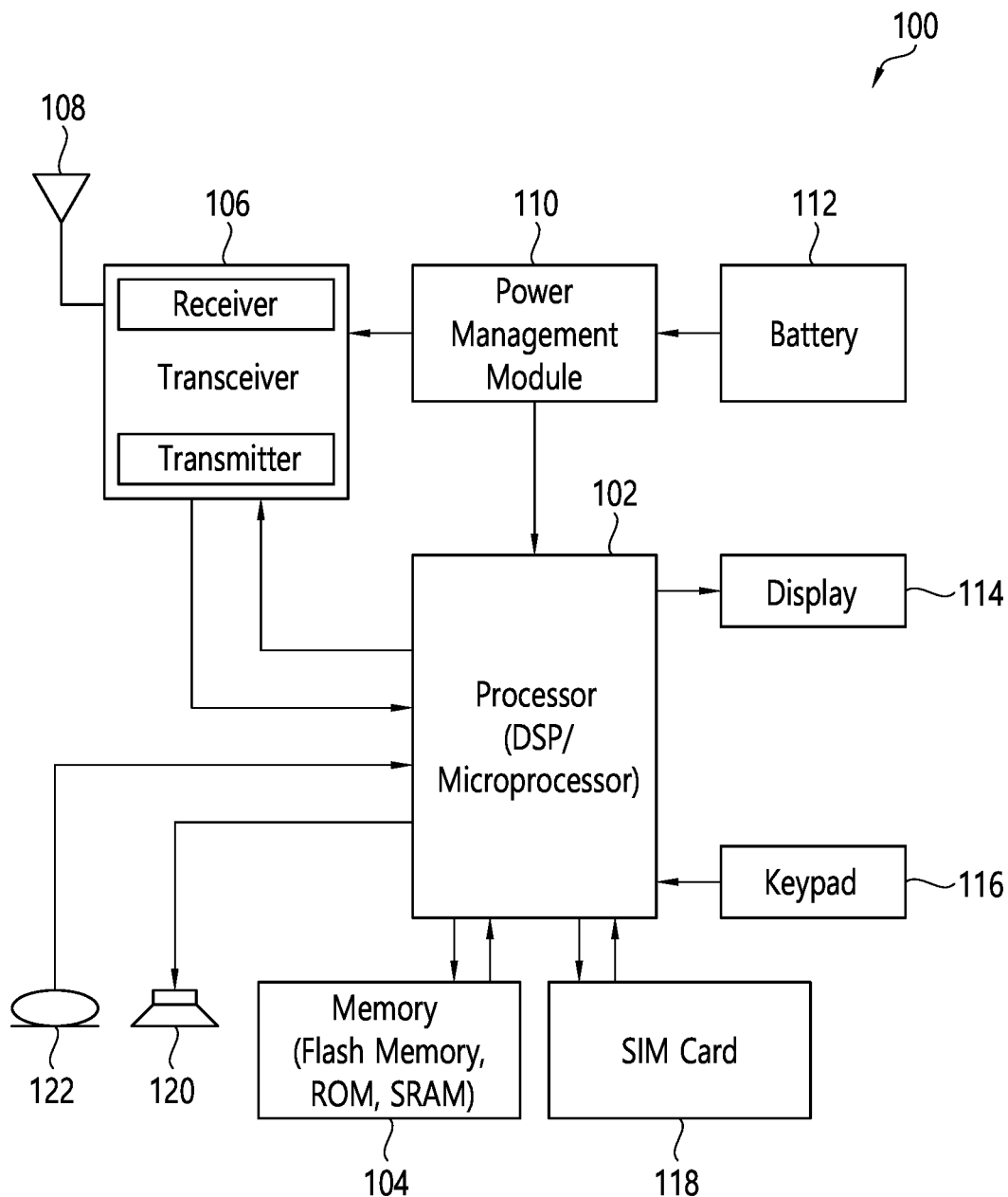
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
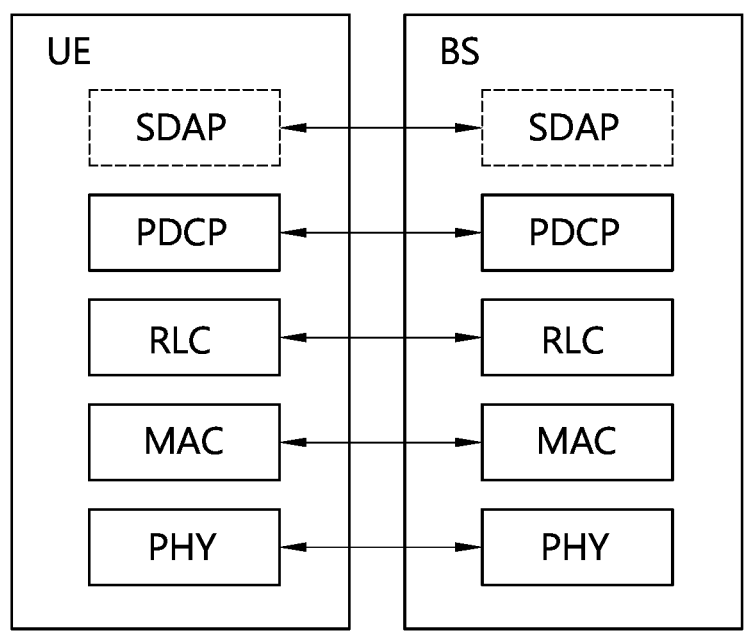
FIGS. 6 and 7 show an example of protocol stacks in a 3GPP based wireless communication system to which implementations of the present disclosure is applied.
Figure 7:
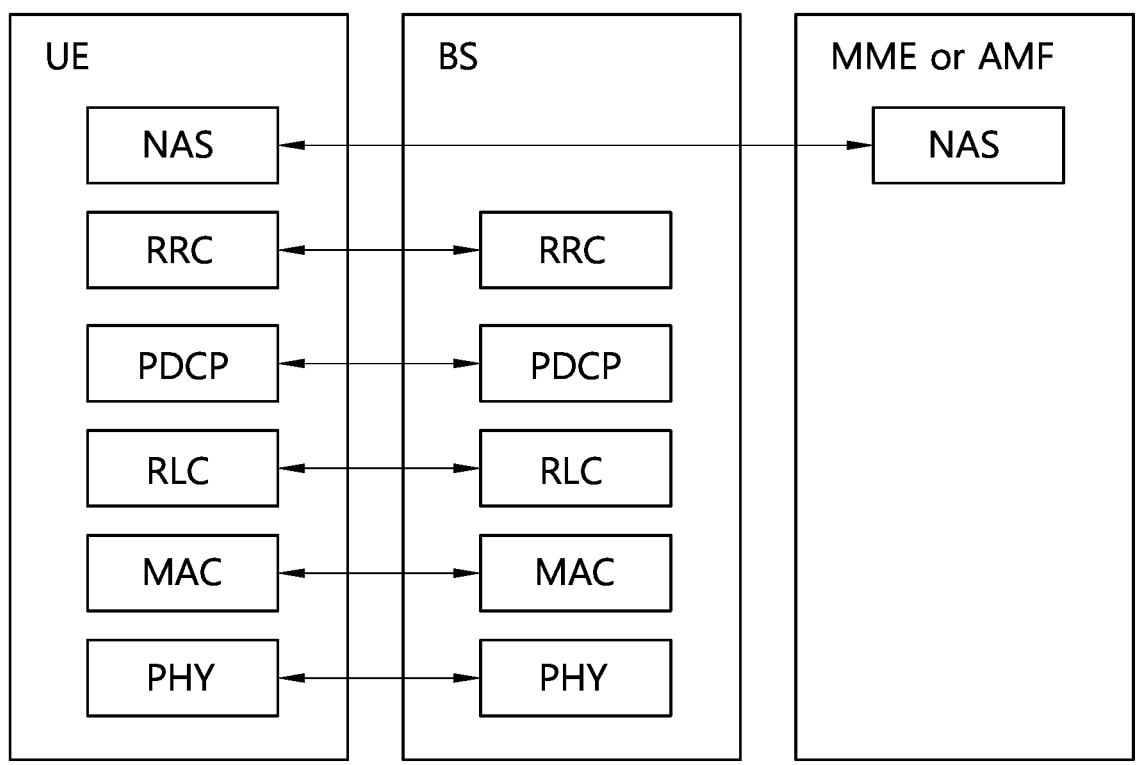

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported.

Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
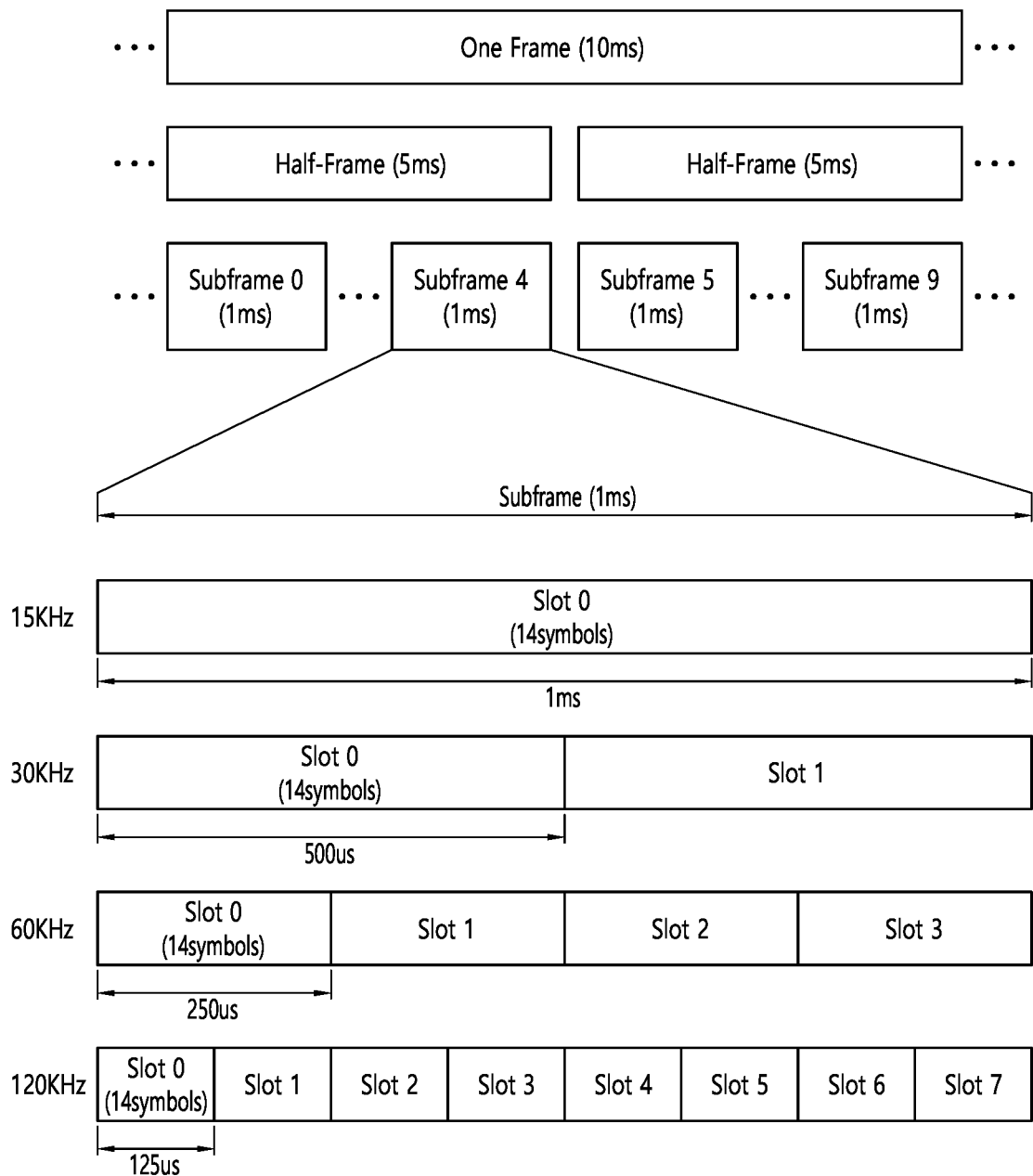
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $t^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE.

Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $N_{CRB}$ is as Follows: $n_{PRB}=n_{CRB}+N^{size}_{BWP}$ where $N^{size}_{BWP,i}$ is the Common Resource Block where Bandwidth Part Starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
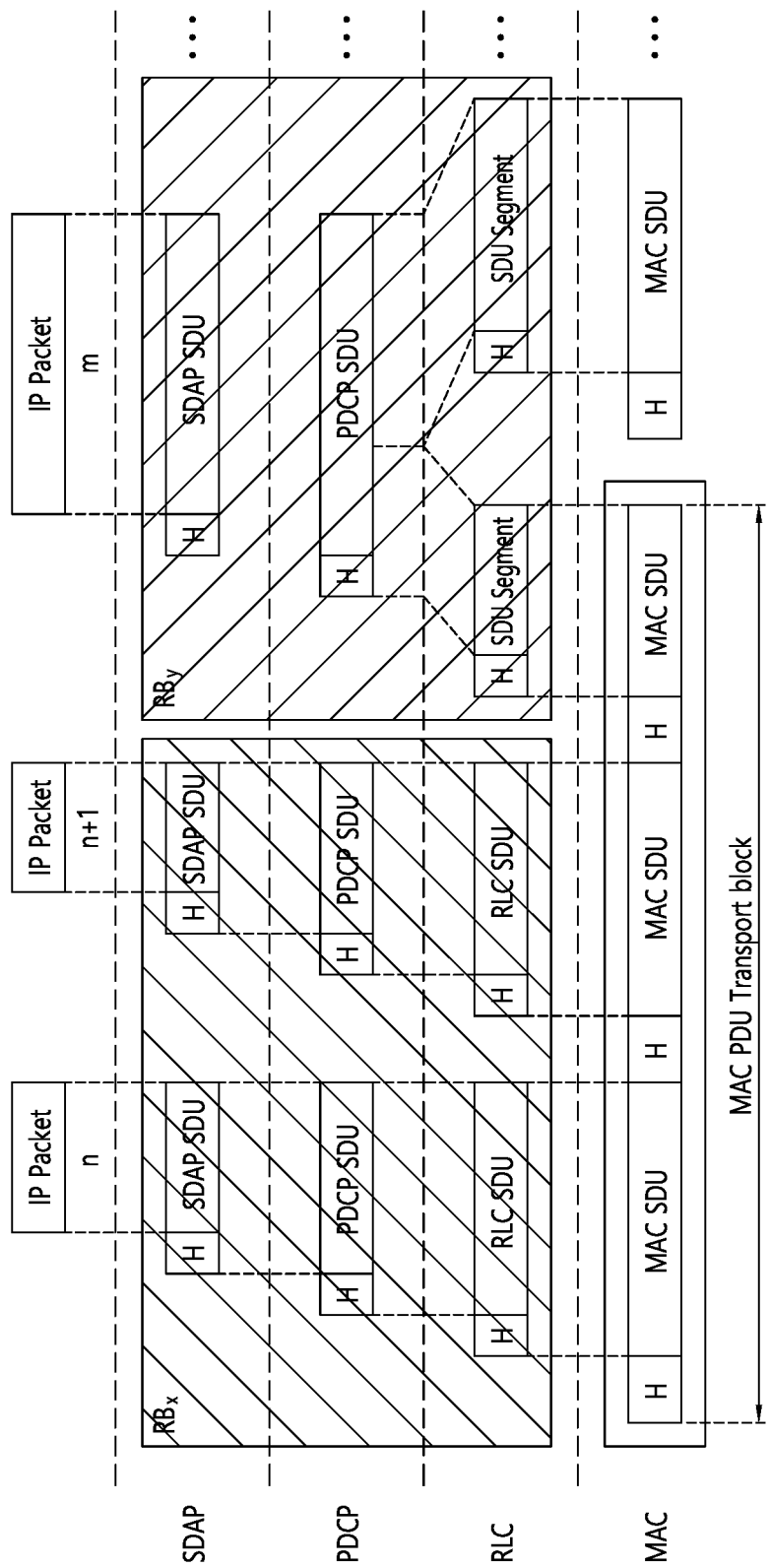
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
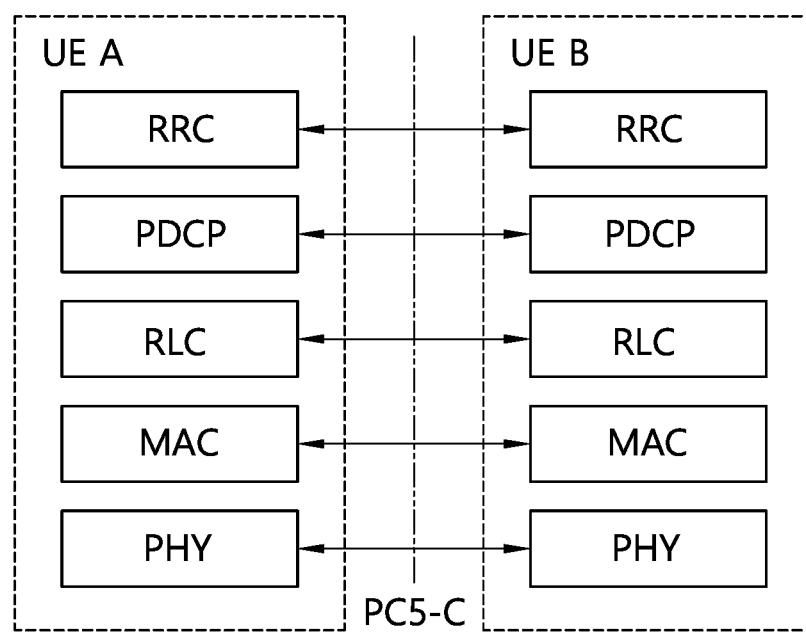
FIGS. 10 and 11 show an example of PC5 protocol stacks to which implementations of the present disclosure is applied.
Figure 11:
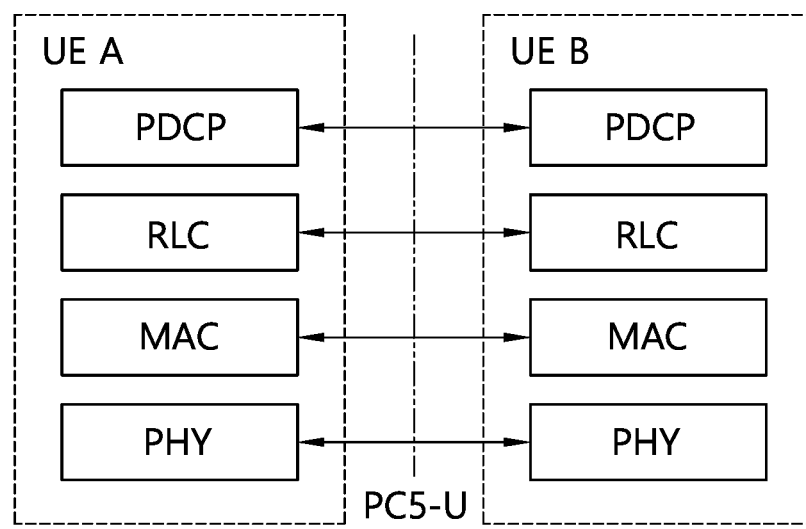

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID

Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
a) UE autonomously selects SL resource for transmission
b) UE assists SL resource selection for other UE(s)
c) UE is configured with NR configured grant (Type-1 like) for SL transmission
d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements.

The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions

SL measurements

Detection of SL transmissions

The following aspects may be considered for SL resource selection:

How a UE selects resource for PSCCH and physical sidelink shared channel (PSSCH) transmission (and other SL physical channel/signals that are defined)

Which information is used by UE for resource selection procedure

Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:

Scheduling UE is configured by gNB

Application layer or pre-configuration selects scheduling UE

Receiver UE schedules transmissions of the transmitter UE during the session

Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

FIG. 12 shows an example of PC5 link setup to which implementations of the present disclosure is applied.

Referring to FIG. 12, an initiating UE transmits a direct communication request message to a target UE for PC5 link setup. Upon transmitting the direct communication request message, the timer T4100 may start. Upon receiving the direct communication request message from the initiating UE, the target UE transmits a direct communication accept message to the initiating UE in response to the direct communication request message. Upon transmitting the direct communication accept message, the timer T4108 may start. Upon receiving the direct communication accept message from the target UE, PC5 link can be established successfully, upon which the timer T4100 may stop.

Alternatively, referring to FIG. 12, an initiating UE transmits a direct communication request message to a target UE for PC5 link setup. Upon transmitting the direct communication request message, the timer T4100 may start. Upon receiving the direct communication request message from the initiating UE, the target UE transmits a direct communication reject message to the initiating UE in response to the direct communication request message. Upon receiving the direct communication reject message from the target UE, PC5 link setup procedure may stop, upon which the timer T4100 may stop.

Figure 13:
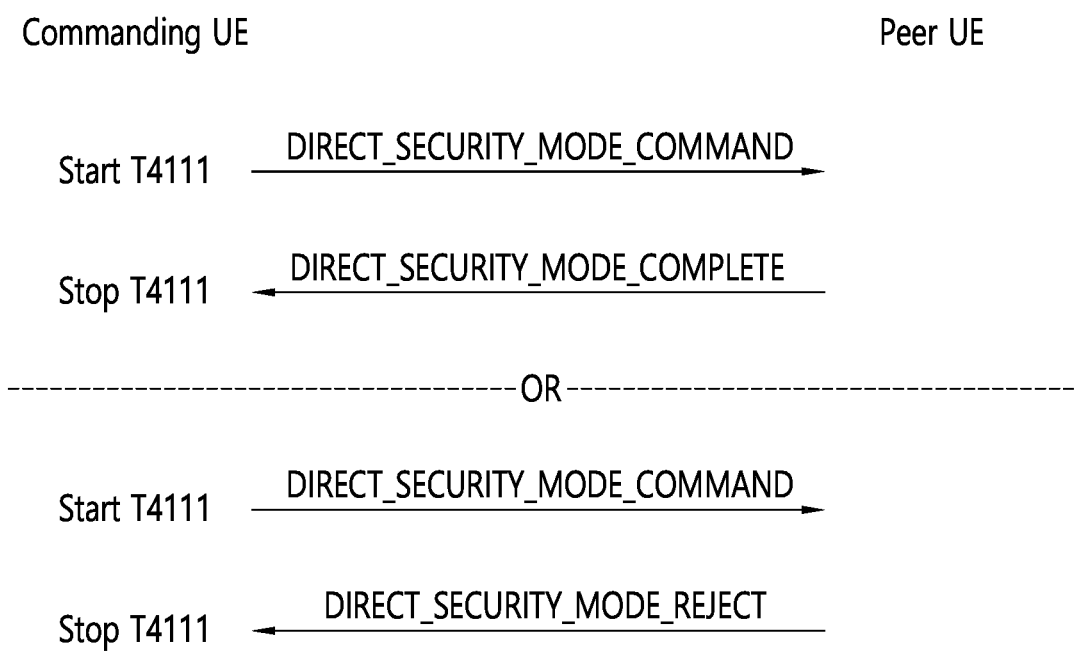
FIG. 13 shows an example of security mode control to which implementations of the present disclosure is applied.

FIG. 13 shows an example of security mode control to which implementations of the present disclosure is applied.

Referring to FIG. 13, a commanding UE transmits a direct security mode command message to a peer UE for security mode control. Upon transmitting the direct security mode command message, the timer T4111 may start. Upon receiving the direct security mode command message from the commanding UE, the peer UE transmits a direct security mode complete message to the commanding UE in response to the direct security mode command message. Upon receiving the direct security mode complete message from the peer UE, security mode can be controlled successfully, upon which the timer T4111 may stop.

Alternatively, referring to FIG. 13, a commanding UE transmits a direct security mode command message to a peer UE for security mode control. Upon transmitting the direct security mode command message, the timer T4111 may start. Upon receiving the direct security mode command message from the commanding UE, the peer UE transmits a direct security mode reject message to the commanding UE in response to the direct security mode command message. Upon receiving the direct security mode reject message from the peer UE, security mode control procedure may stop, upon which the timer T4111 may stop.

Figure 14:
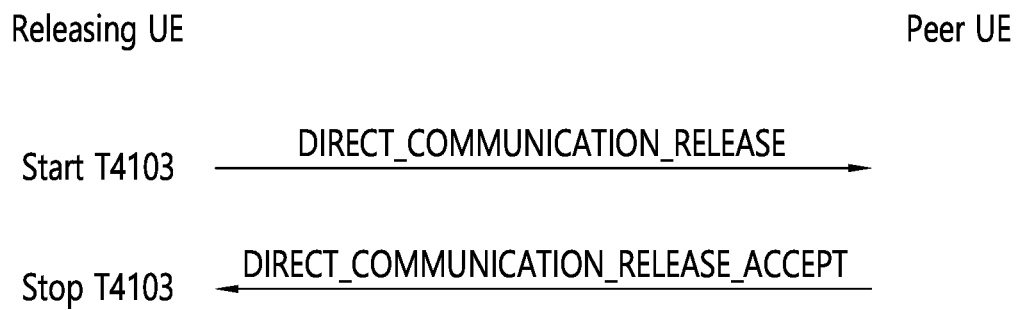
FIG. 14 shows an example of PC5 link release to which implementations of the present disclosure is applied.

FIG. 14 shows an example of PC5 link release to which implementations of the present disclosure is applied.

Referring to FIG. 14, a releasing UE transmits a direct communication release message to a peer UE for PC5 link release. Upon transmitting the direct communication release message, the timer T4103 may start. Upon receiving the direct communication release message from the releasing UE, the peer UE transmits a direct communication release accept message to the releasing UE in response to the direct communication release message. Upon receiving the direct communication release accept message from the peer UE, PC5 link can be released successfully, upon which the timer T4103 may stop.

However, exchange of PC5 signaling would be vulnerable to transmission loss sometimes. Therefore, PC5 link setup and/or management may be delayed or failed. Such delay and/or failure over PC5 signaling will result service delay, interruption and/or blockage which could be critical to vehicles using road safety services. In other words, a method for establishing and/or managing PC5 link with robustness may be required.

Figure 15:
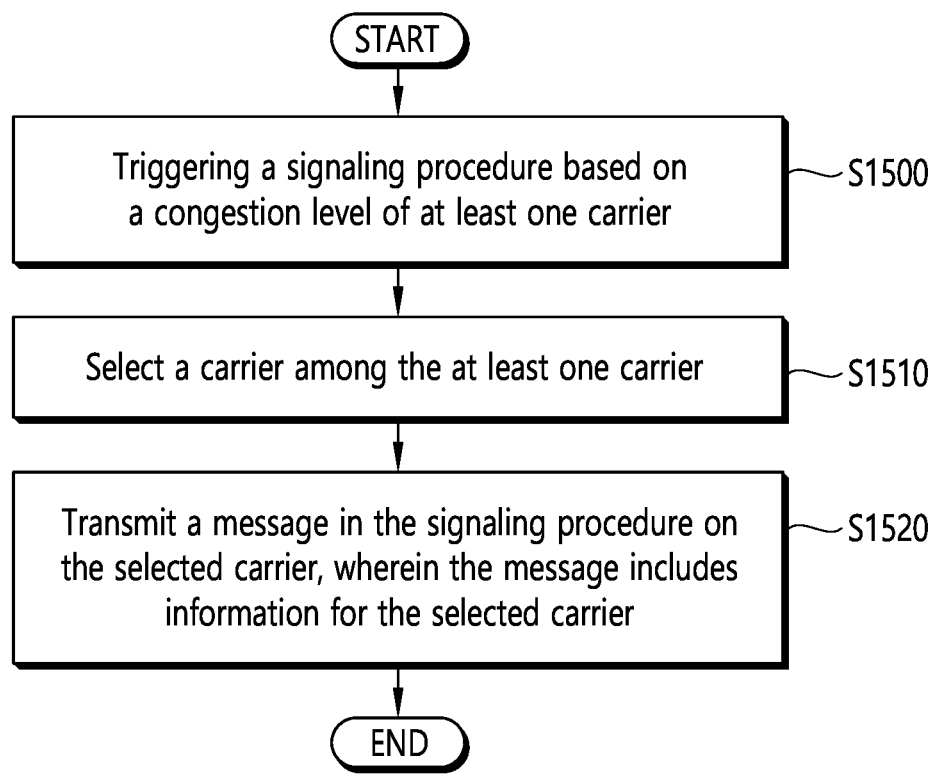
FIG. 15 shows an example of a method for a first wireless device according to implementations of the present disclosure.

FIG. 15 shows an example of a method for a first wireless device according to implementations of the present disclosure.

Referring to FIG. 15, the first wireless device may be in communication with at least one of a mobile device, a network, and/or autonomous vehicles other than the first wireless device. The first wireless device may be a wireless device initiating a signaling procedure (may be simply called an initiating wireless device). For example, the signaling procedure may be connection establishment procedure. In this case, the first wireless device may be a connection requesting wireless device.

In step S1500, the first wireless device triggers a signaling procedure based on a congestion level of at least one carrier.

In some implementations, the signaling procedure may include connection establishment. The signaling procedure may be mapped to the at least one carrier.

In step S1510, the first wireless device selects a carrier among the at least one carrier.

In some implementations, the selected carrier may have lower congestion level than a threshold. The threshold may be indicated by a network or other wireless device. In some implementations, the selected carrier has a lowest congestion level among the at least one carrier. In some implementations, the congestion level of the selected carrier and the congestion level of other carriers among the at least one carrier are within a particular range.

In step S1520, the first wireless device transmits a message in the signaling procedure on the selected carrier. The message includes information for the selected carrier.

In some implementations, when the signaling procedure corresponds to connection establishment, the message may correspond to a connection request message.

In some implementations, the selected carrier includes more than one carrier. In this case, the message may be duplicated for the more than one carrier, and the duplicated messages may be transmitted respectively on each of the more than one carrier.

In some implementations, the information for the selected carrier may include the congestion level of the selected carrier. The message may include information for carriers that the first wireless device supports for transmission and/or reception. The message may include an ID of the first wireless device and/or an ID of a second wireless device.

In some implementations, transmitting the message may comprise allocating a grant for the selected carrier, and transmitting the message in the signaling procedure on the selected carrier by using the grant. The grant may be created by the first wireless device and/or provided by a network.

In some implementations, the message may be transmitted to a second wireless device and/or a network.

In some implementations, the first wireless device may further monitor a carrier among the at least one carrier. In some implementations, the first wireless device further perform carrier reselection upon receiving a response message on the monitored carrier in response to the message. The reselected carrier may be one of the selected carrier.

In some implementations, when the signaling procedure corresponds to connection establishment, the response message may correspond to a connection response message.

In some implementations, the carrier reselection may be performed based on information included in the response message. The information may include the congestion level of the selected carrier. The information may include information for the selected carrier. The response message may include an ID of the first wireless device and/or an ID of a second wireless device.

Figure 16:
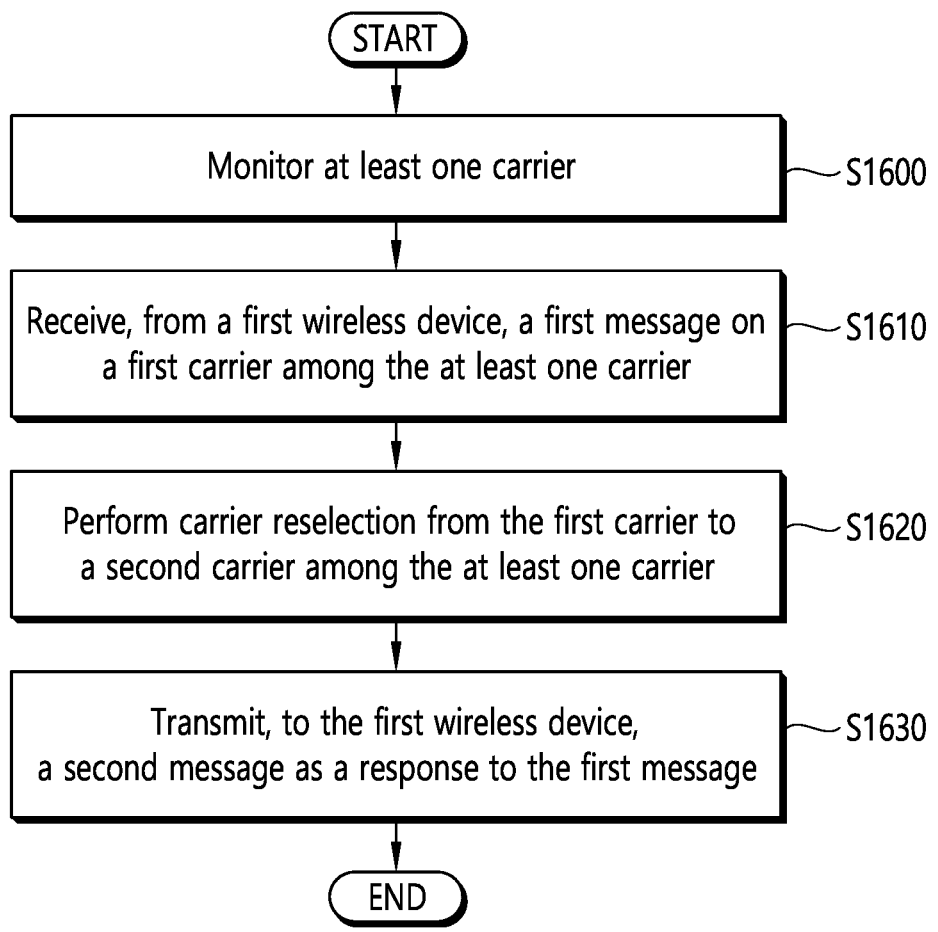
FIG. 16 shows an example of a method for a second wireless device according to implementations of the present disclosure.

FIG. 16 shows an example of a method for a second wireless device according to implementations of the present disclosure.

Referring to FIG. 16, the second wireless device may be in communication with at least one of a mobile device, a network, and/or autonomous vehicles other than the second wireless device. The second wireless device may be a target wireless device of a signaling procedure, e.g., connection establishment procedure.

In step S1600, the second wireless device monitors at least one carrier.

In some implementations, the at least one carrier may be mapped to one or more services. The one or more services may be related to unicast transmission and/or groupcast transmission.

In step S1610, the second wireless device receive, from a first wireless device, a first message on a first carrier among the at least one carrier.

In some implementations, the first message may be related to a signaling procedure.

The signaling procedure may include connection establishment. In some implementations, when the signaling procedure corresponds to connection establishment, the first message may correspond to a connection request message.

In some implementations, the first message may include information for the first carrier. The information for the first carrier may include a congestion level of the first carrier. The first message may include information for carriers that the first wireless device supports for transmission and/or reception. The first message may include an ID of the first wireless device and/or an ID of the second wireless device.

In step S1620, the second wireless device performs carrier reselection from the first carrier to a second carrier among the at least one carrier.

In some implementations, the second carrier may be a carrier where the first message was received. In some implementations, the second carrier may be a carrier indicated by the first message.

In some implementations, the second carrier may have a congestion level lower than a threshold. The threshold may be indicated by one of the first wireless device, other wireless device or a network. In some implementations, the second carrier may have a lowest congestion level among the at least one carrier. In some implementations, the second carrier may have a lowest congestion level among carriers indicated or mapped to the first message.

In step S1630, the second wireless device transmits, to the first wireless device, a second message as a response to the first message.

In some implementations, when the signaling procedure corresponds to connection establishment, the second message may correspond to a connection response message.

In some implementations, the second carrier may include more than one carrier, and the second message may be duplicated for the more than one carrier. The duplicated second messages may be transmitted respectively on each of the more than one carrier.

In some implementations, transmitting the second message may comprise allocating a grant for the second carrier, and transmitting the message on the second carrier by using the grant. The grant may be created by the second wireless device and/or provided by a network.

In some implementations, the second message may include information for the second carrier. The second message may include information for carriers that the second wireless device supports for transmission and/or reception. The second message may include an ID of the first wireless device and/or an ID of the second wireless device.

Figure 17:
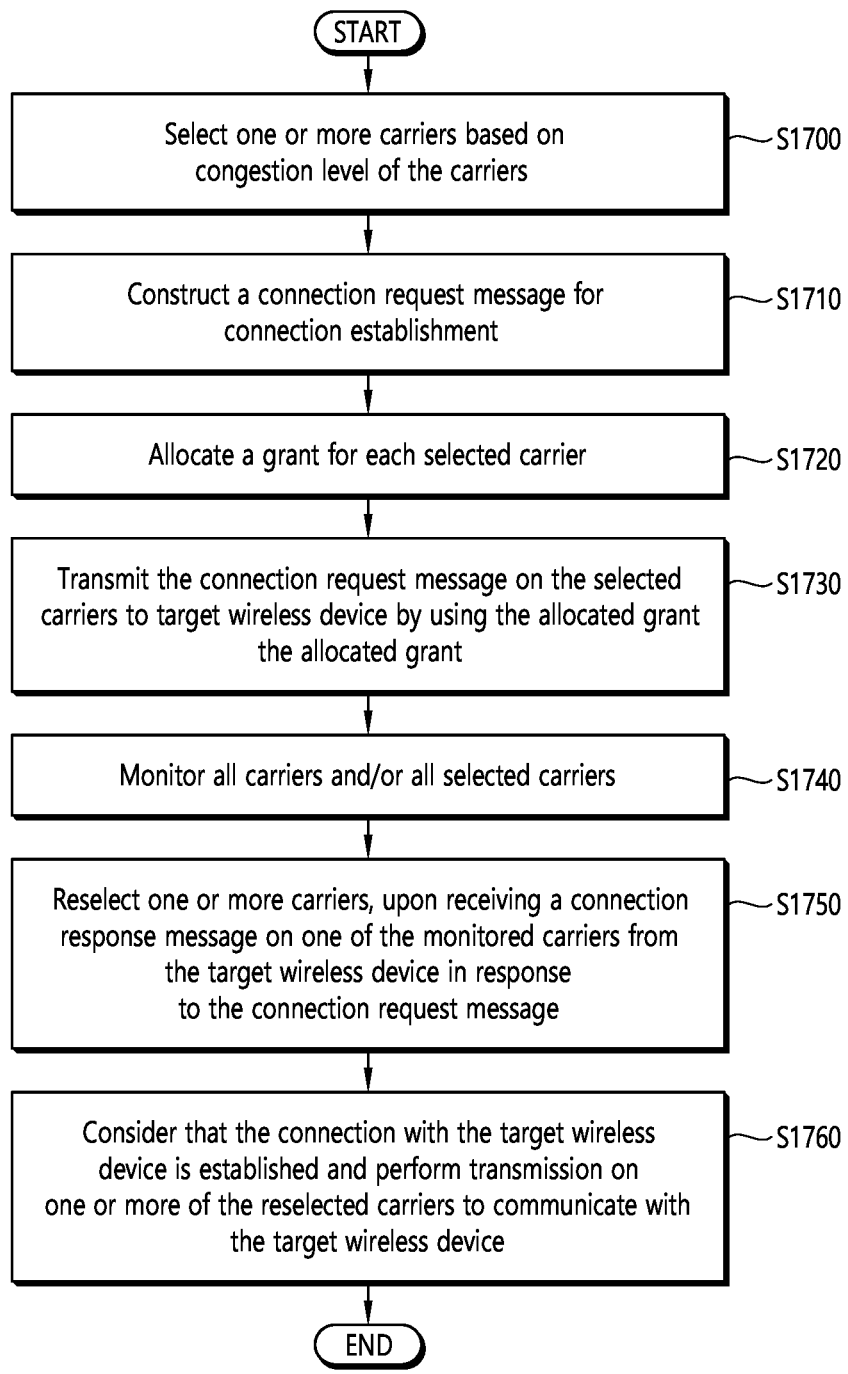
FIG. 17 shows an example of for establishing a connection by an initiating wireless device according to implementations of the present disclosure.

FIG. 17 shows an example of for establishing a connection by an initiating wireless device according to implementations of the present disclosure.

In step S1700, connection establishment is triggered. An initiating wireless device (or, connection requesting wireless device) initially selects one or more carriers based on congestion level of carriers. The carriers may be mapped to what triggers the connection establishment.

In some implementations, the selected carrier may have a lower congestion level than a threshold. In some implementations, the selected carrier may have the lowest congestion level among the carriers. In some implementations, the initiating wireless device may select the other carrier(s), so that the congestion level of the selected carrier and the congestion level of the other carrier are within a particular range.

In step S1710, the initiating wireless device constructs a connection request message for connection establishment. If the selected carrier is more than one, the initiating wireless device may duplicate the constructed connection request message.

In some implementations, the connection request message may include information for the congestion level of the selected carrier. The connection request message may indicate one, some or all of the selected carrier. The connection request message may include information for carriers that the initiating wireless device supports for transmission and/ or reception, e.g. for each band or each band combination. The connection request message may include a UE ID of the initiating wireless device and/or a UE ID of other wireless device.

In step S1720, the initiating wireless device allocates a grant for each selected carrier. The grant may be autonomously created by the initiating wireless device or given by a network.

In step S1730, the initiating wireless device transmits the connection request messages on the selected carrier to the other node by using the allocated grant. When the connection request message is duplicated for more than one selected carriers, the one message may be transmitted on each of the more than one selected carriers.

In some implementations, the other node may be either other wireless device, i.e., a target wireless device, or a network node such as a base station.

In step S1740, the initiating wireless device monitors all carriers mapped to what triggers the connection establishment and/or all of the selected carrier.

In step S1750, the initiating wireless device receives a connection response message on one of the monitored carrier from the other node in response to the connection request message. Upon receiving the connection response message, the initiating wireless device re-selects one or more carriers.

In some implementations, the re-selected carrier may be one of the initially selected carriers.

In some implementations, the re-selected carrier may be reselected based on information included in the connection response message. For example, the information may include congestion level information of the initially selected carrier and/or an indicator for the initially selected carrier.

In some implementations, the connection response message may include the UE ID of the initiating wireless device and/or the UE ID of the other node.

In step S1760, the initiating wireless device considers that the connection with the other node is established. The initiating wireless may perform transmission on one or more of the reselected carriers to communicate with the other node. The initiating wireless may not use any carrier which is initially selected but not reselected for transmission.

Figure 18:
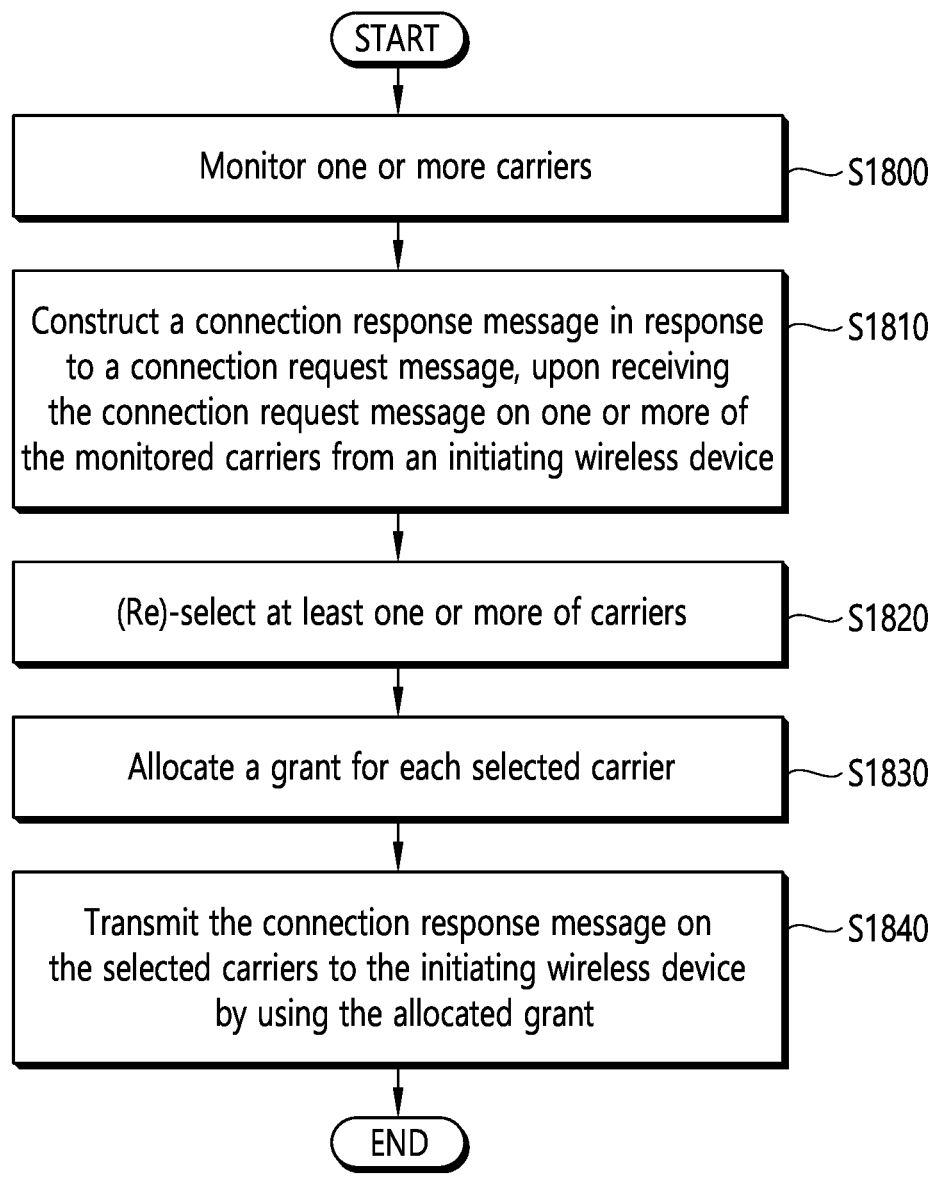
FIG. 18 shows an example of for establishing a connection by a target wireless device according to implementations of the present disclosure.

FIG. 18 shows an example of for establishing a connection by a target wireless device according to implementations of the present disclosure.

In step S1800, the target wireless device monitors one or more carriers.

In some implementations, the one or more carriers may be mapped to one or more services which the target wireless device may use. The service may be related to unicast transmission and/or groupcast transmission in sidelink.

In step S1810, the target wireless device receives a connection request message on one or more of the monitored carriers from an initiating wireless device. Upon receiving the connection request message, the target wireless device constructs a connection response message in response to the connection request message.

In step S1820, upon receiving the connection request message and/or constructing the connection response message, the target wireless device (re-)selects at least one carrier.

In some implementations, the selected carrier may be a carrier where the connection request message was received.

In some implementations, the selected carrier may be a carrier indicated by the connection request message. In some implementations, the selected carrier may be a carrier which has a congestion level lower than a threshold. The threshold may be indicated by the initiating wireless device or the other node such as a certain wireless device or a base station. In some implementations, the selected carrier may be a carrier which has the lowest congestion level among the carriers indicated by or mapped to the connection request message.

In some implementations, if there are more than one selected carrier, the target wireless device may duplicate the connection response message.

In step S1830, the target wireless device allocates a grant for each selected carrier. The grant may be autonomously created by the target wireless device or given by a base station.

In step S1840, the target wireless device transmits the connection response message on the selected carrier to the initiating wireless device by using the allocated grant. When the connection response message is duplicated for more than one selected carriers, the one message may be transmitted on each of the more than one selected carriers.

In some implementations, the connection response message may include information for the carrier where the connection response messages are transmitted. The connection response message may include information for carriers that the target wireless device supports for transmission and/or reception. e.g., for each band or each band combination.

Figure 19:
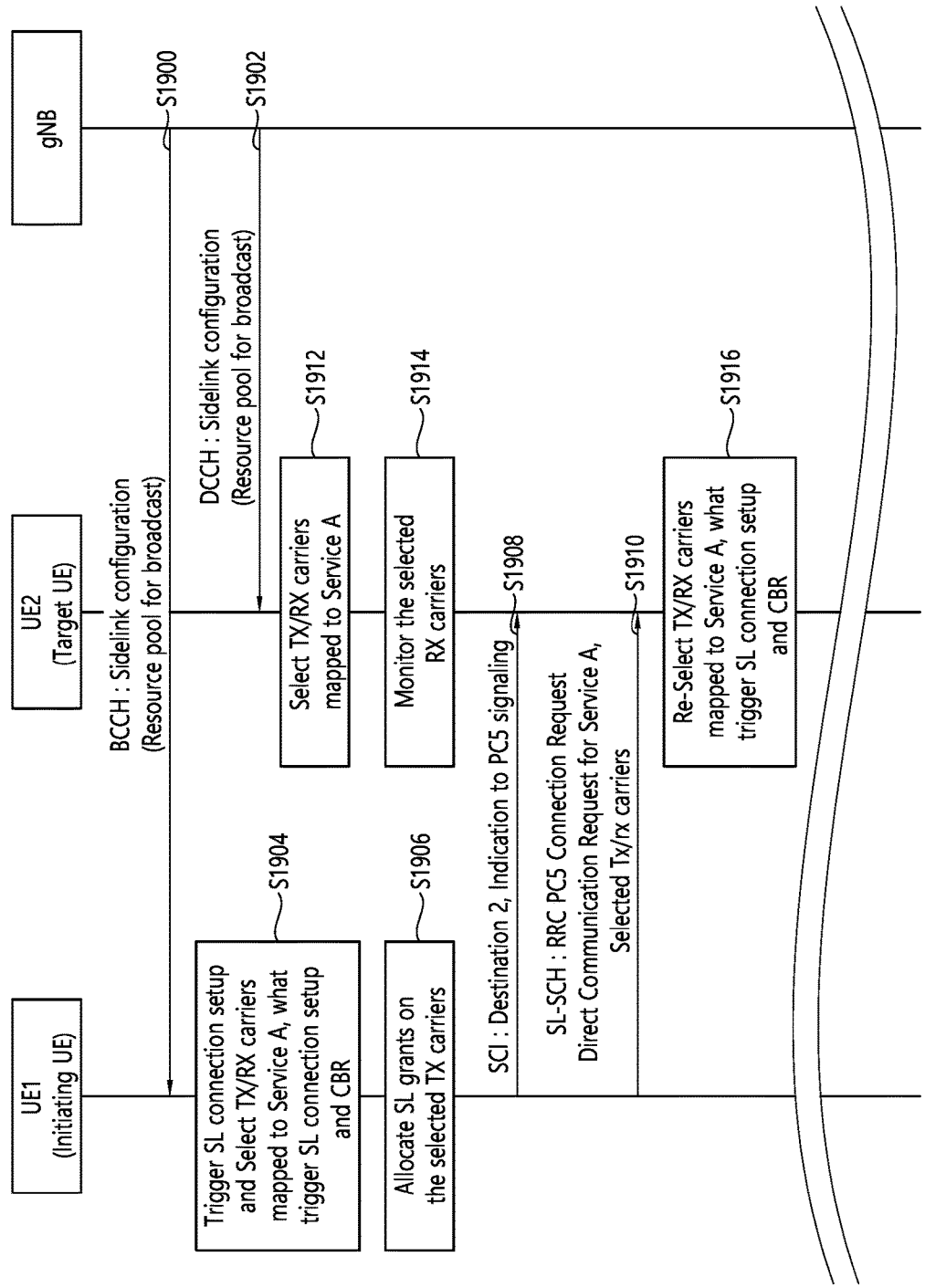

FIGS. 19 and 20 shows an example of PC5 connection establishment between two UEs according to implementations of the present disclosure.

First, FIG. 19 is described.

In step S1900, UE1 (i.e., initiating UE in connection establishment) may camp on a cell and may receive system information including at least sidelink configuration via BCCH broadcast by gNB. The sidelink configuration may include at least one or more resource pools which are used for several UEs to perform broadcast transmissions in sidelink.

In step S1902, UE2 (i.e., target UE in connection establishment) may receive dedicated signaling including at least sidelink configuration via DCCH from gNB. The sidelink configuration may include at least one or more resource pools which are used for several UEs to perform broadcast transmissions in sidelink.

In some implementations, based on mapping between carriers and Service A, UE1 may select one or more carriers where resource pools are configured for V2X sidelink communication and may allocate sidelink grant for sidelink broadcast services and/or monitor sidelink transmissions on the selected carriers. UE1 may perform channel busy ratio (CBR) on the resource pools and/or receive system information indicating CBR level on the resource pools from gNB.

In step S1904, if connection establishment is triggered for a particular service (e.g., Service A) for PC5, i.e., direct interface between two UEs, UE1 may initially select one or more carriers based on CBR level of the carriers mapped to what triggers the connection establishment.

In some implementations, the number of the selected carriers may be configured by gNB or pre-configuration. In some implementations, the selected carrier may be mapped to what triggers the connection establishment (e.g., provider service identifier (PSID) and/or cause of connection establishment).

In some implementations, the selected carrier may have a lower CBR level than a threshold. In some implementations, the selected carrier may have the lowest CBR level among carriers mapped to Service A. In some implementations, UE1 may select the other carrier(s), so that the CBR level of the selected carrier and the CBR level of the other carrier are within a particular range.

In some implementations, the Service A may be defined by PSID. Different PSID values may be used to address different services for V2X sidelink communication.

In step S1906, UE1 may allocate a grant for each selected carrier. The grant may be autonomously created by UE1 or given by a base station.

In step S1908, UE1 may transmit SCI to UE2. The SCI may indicate destination of the sidelink transmission (e.g., UE2) and/or indication to PC5 signaling.

In step S1910, UE1 may transmit a RRC PC5 connection request message on the selected carrier to UE2 by using the allocated grant.

In some implementations, if the number of the selected carrier is more than one, UE1 may construct the connection request message and duplicates the connection request message for the more than one selected carriers. The RRC layer, the PDCP layer and/or a lower layer may perform duplication of the connection request message and/or a PDU/SDU carrying the connection request message. In this case, each message of the duplicated connection request messages may be transmitted respectively on each carrier of the more than one selected carriers.

In some implementations, if UE1 establishes a PC5 connection for Service A, the connection request message may include direct communication request for Service A provided by upper layers than RRC layer.

In some implementations, the connection request message may include information for the congestion level (e.g., CBR level/value) of the selected carrier. The connection request message may include information for one, some or all of the selected carriers where the connection request message is transmitted. The connection request message may include information for carriers that UE1 supports for transmission and/or reception. e.g., for each band or each band combination. The connection request message may include a UE ID of UE1 and/or a UE ID of UE2.

In step S1912, UE2 may select one or more carriers mapped to one or more services including Service A. In step S1914, UE2 may monitor the selected carrier.

In some implementations, if UE2 receives the connection request message on one or more of the monitored carrier from UE1, UE2 may construct a connection response message in response to the connection request message.

In some implementations, if UE1 requests establishment of a PC5 connection for Service A, UE2 may determine whether to accept or reject the request. Based on this decision, the connection response message may include direct communication accept or reject for Service A provided by upper layers than RRC layer.

In step S1916, upon receiving the connection request message and/or constructing the connection response message, if the connection response message becomes available in L2 buffer for a logical channel mapped to sidelink signaling (e.g., sidelink control channel (SCCH), UE2 selects or reselects at least one carrier.

In some implementations, the selected carrier may be a carrier where the connection request message was received. In some implementations, the selected carrier may be a carrier indicated by the connection request message. In some implementations, the selected carrier may be a carrier which has a congestion level lower than a threshold. The threshold may be indicated by UE1 or the other node such as a certain UE or a base station. In some implementations, the selected carrier may be a carrier which has the lowest congestion level among the carriers indicated by or mapped to the connection request message.

Now, FIG. 20 which follows FIG. 19 is described.

In step S2000, if UE2 is in RRC_CONNECTED and configured for gNB scheduled sidelink resource allocation (i.e., Mode 1 described above), UE2 may transmit sidelink UE information to gNB. The sidelink UE information may include at least one of traffic pattern of Service A, TX carriers and/or RX carriers mapped to Service A, QoS information related to Service A (e.g., 5G QoS indicator (5QI), proximity-based services (ProSe)-per-packet priority (PPPP), ProSe-per-packet reliability (PPPR), QoS class indicator (QCI) value), service type of Service A (e.g., unicast transmission, groupcast transmission or broadcast transmission), and/or destination related to Service A and/or UE1 (e.g., destination ID, destination Index and/or UE ID mapped to Service A and/or UE1).

In step S2002, after receiving the sidelink UE information, gNB may construct sidelink configuration at least including one or more resource pools for Service A and/or unicast transmission with UE1 and Sidelink buffer status report (BSR) configuration such as mapping between a logical channel group (LCG) and one or more QoS values or mapping between a LCG and the service type of Service A. gNB may signal the sidelink configuration to UE2. Then, UE2 may configure lower layers with sidelink configuration.

In step S2004, if a message becomes available in L2 buffer for sidelink transmission, UE2 may trigger scheduling request (SR) for sidelink signaling (e.g., a particular SCCH and/or sidelink connection establishment), so that UE2 transmits PUCCH resource mapped to sidelink signaling. If PUCCH resource is not configured, UE2 may perform random access procedure as the scheduling request. If an uplink grant is given at a result of the SR, UE2 may transmit sidelink BSR to gNB. The sidelink BSR may indicate at least a destination index or UE Index, a LCG, and a buffer size corresponding to the destination service, the destination group or the destination UE (UE1). The Destination Index may address the destination service, the destination group and/or the destination UE. The UE Index may address the destination/receiving UE, i.e., UE1.

In step S2006, after receiving the SL BSR, gNB may transmit a sidelink grant to UE2. e.g., by sending downlink control information (DCI) in PDCCH. The DCI may include an allocated sidelink resource, the destination index and/or UE index. The index may be used to indicate the Service A and/or UE1 explicitly or implicitly. If UE2 receives the DCI, UE2 may use the sidelink grant for transmission to UE1.

Alternatively, if UE2 is configured for UE autonomous scheduling of sidelink resource allocation (i.e., Mode 2 described above), UE2 may autonomously select and/or reselect sidelink resources to create a sidelink grant used for transmission to UE 1.

In step S2008, UE2 may allocate a grant for each selected carrier. The grant may be autonomously created by UE2 or given by a base station.

In step S2010, UE2 may transmit SCI to UE1. The SCI may indicate destination of the sidelink transmission (e.g., UE1) and/or indication to PC5 signaling.

In step S2012, UE2 may transmit a RRC PC5 connection response message on the selected carrier to UE1 by using the allocated grant.

In some implementations, if the number of the selected carrier is more than one, UE2 may construct the connection response message and duplicates the connection response message for the more than one selected carriers. The RRC layer, the PDCP layer and/or a lower layer may perform duplication of the connection response message and/or a PDU/SDU carrying the connection response message. In this case, each message of the duplicated connection response messages may be transmitted respectively on each carrier of the more than one selected carriers.

In some implementations, the connection response message may include information for the selected carrier where the connection response message is transmitted. The connection response message may include information for carriers that UE2 supports for transmission and/or reception, e.g., for each band or each band combination.

In step S2014, after transmission to UE2, UE1 may begin to monitor all carriers mapped to Service A and/or what triggers the connection request message and/or all of the selected carriers.

In step S2016, if UE1 receives the connection response message on one of the monitored carriers from UE2 in response to the connection request message, the UE1 may re-select one or more carriers. That is, UE1 may trigger the TX carrier reselection procedure.

In some implementations, the re-selected carrier may correspond to one of the initially selected carriers. In some implementations, the re-selected carrier may be reselected based on information included in the received connection response message. For example, the information may include congestion level of the initially selected carrier and/or an indicator for the initially selected carrier or TX/RX carriers selected by UE2 or UE capability of UE2.

In some implementations, the connection response message may include the UE ID of UE1 and/or the UE ID of UE2.

In some implementations, after receiving the connection response message, UE1 may transmit acknowledgement to the connection response message. The acknowledgement may be one of physical signaling and/or Layer 2 message such as a MAC control element (CE).

In some implementations, if the request was accepted, UE1 may consider that the connection with UE2 is established, and then, may perform transmission on one or more of the reselected carriers to communicate with UE2. UE1 may not use any carrier initially selected but not reselected for transmission.

In some implementations, if the request was accepted, UE1 may successfully complete upper layer link establishment for Service A as well as RRC connection establishment. In some implementations, if the request was rejected, UE1 may unsuccessfully complete upper layer link establishment for Service A as well as RRC connection establishment.

In step S2018, after receiving the acknowledgement to the connection response message from UE1, if the request was accepted, UE2 may re-select one or more carriers. That is, UE2 may trigger the TX carrier reselection procedure. UE2 may consider that the connection with UE1 is established, and then, may perform transmission on one or more of the reselected carriers to communicate with UE1. UE2 may not use any carrier initially selected but not reselected for transmission.

In some implementations, the re-selected carrier may correspond to one of the initially selected carriers. In some implementations, the re-selected carrier may be reselected based on information included in the received connection request message.

The present disclosure can have various advantageous effects.

For example, one wireless device performing sidelink communication can perform fast and reliable connection establishment with another wireless device by selecting multiple carriers of which congestion level is low enough to provide sidelink grant and reliable signaling to the wireless device with little loss, in particular when what triggers sidelink connection or sidelink service are mapped to multiple carriers.

For example, the system can provide fast and reliable sidelink connection establishment for a wireless device performing sidelink communication with another wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method for a first wireless device in a wireless communication system, the method comprising:
   receiving, from a radio access network (RAN) node, system information including a sidelink configuration via a Broadcast Control Channel (BCCH),
   wherein the sidelink configuration includes information on resource pools which are used for several wireless devices to perform sidelink transmissions;
   selecting one or more carriers from the resource pools;
   determining a congestion level of the one or more carriers based on Channel Busy Ratio (CBR) measurements on the one or more carriers;
   triggering a connection establishment procedure for a PC5 connection between the first wireless device and a second wireless device for a specific service, wherein the connection establishment procedure is mapped to the one or more carriers;
   selecting a first carrier having a lowest congestion level from the one or more carriers for the specific service;
   allocating a sidelink grant for the first carrier for the specific service;
   transmitting, to the second wireless device, a connection request message in the connection establishment procedure on the first carrier based on the allocated sidelink grant, wherein the connection request message includes information for the first carrier;
   monitoring the one or more carriers mapped to the connection establishment procedure;
   receiving, from the second wireless device, a connection response message in response to the connection request message on a second carrier, where the second carrier is a carrier among the one or more carriers mapped to the connection establishment procedure; and
   performing carrier reselection upon receiving the connection response message on the second carrier in response to the connection request message.

2. The method of claim 1, wherein the method further comprises,
   selecting multiple carriers including the specific carrier; and
   duplicating the connection request message for the multiple carriers.

3. The method of claim 1, wherein the first wireless device is in communication with at least one of a mobile device, a network, and/or autonomous vehicles other than the first wireless device.

4. A first wireless device in a wireless communication system, comprising:
   at least one transceiver;
   at least processor; and
   at least one computer memory operably connectable to the at least one processor and storing instructions that, based on being executed by the at least one processor, perform operations comprising:
   receiving, from a radio access network (RAN) node, system information including a sidelink configuration via a Broadcast Control Channel (BCCH),
   wherein the sidelink configuration includes information on resource pools which are used for several wireless devices to perform sidelink transmissions;
   selecting one or more carriers from the resource pools;
   determining a congestion level of the one or more carriers based on Channel Busy Ratio (CBR) measurements on the one or more carriers;
   triggering a connection establishment procedure for a PC5 connection between the first wireless device and a second wireless device for a specific service, wherein the connection establishment procedure is mapped to the one or more carriers;
   selecting a first carrier having a lowest congestion level from the one or more carriers for the specific service;
   allocating a sidelink grant for the first carrier for the specific service;
   transmitting, to the second wireless device, a connection request message in the connection establishment procedure on the first carrier based on the allocated sidelink grant, wherein the connection request message includes information for the first carrier;
   monitoring the one or more carriers mapped to the connection establishment procedure;
   receiving, from the second wireless device, a connection response message in response to the connection request message on a second carrier, where the second carrier is a carrier among the one or more carriers mapped to the connection establishment procedure; and
   performing carrier reselection upon receiving the connection response message on the second carrier in response to the connection request message.

* * * * *